Figure 1:
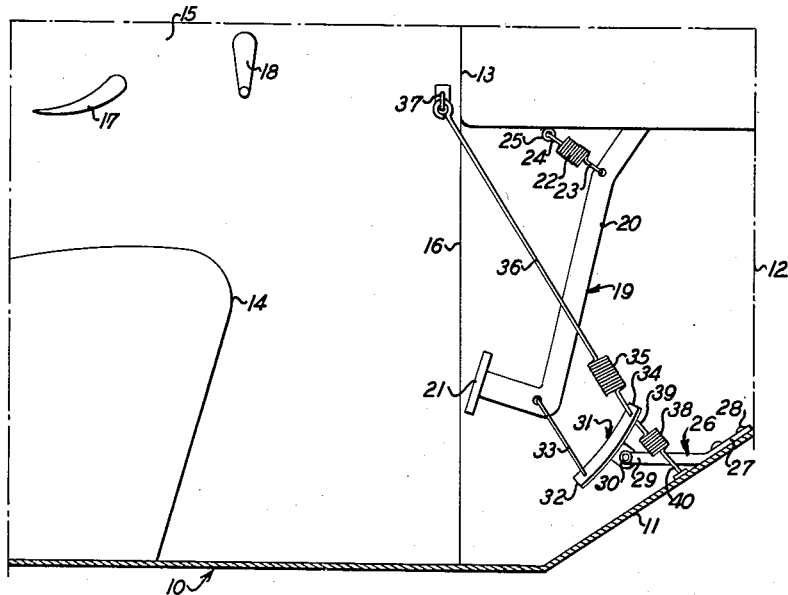

June 26, 1962

H. FARBER 3,040,831

DOOR OPERATED VEHICLE BRAKE MECHANISM

Filed Aug. 8, 1960

INVENTOR

HENRY FARBER

BY Jacobi & Jacobi

ATTORNEYS

United States Patent Office 3,040,831
Patented June 26, 1962

3,040,831
DOOR OPERATED VEHICLE BRAKE MECHANISM
Henry Farber, 69—28 226th St., Bayside 64, N.Y.
Filed Aug. 8, 1960, Ser. No. 48,068
6 Claims. (Cl. 180—82)

This invention relates to automotive vehicles and more particularly to a door operated vehicle brake mechanism which may be installed in a vehicle as original equipment or as an accessory and which serves to provide for automatic setting of the brakes upon opening of one or more doors of the vehicle. This application is a continuation in part of my co-pending application Serial No. 778,361, filed December 5, 1958 and now Patent No. 2,963,107, issued Dec. 6, 1960.

As is well known, all automotive vehicles are at present provided with what is commonly known as a parking brake which is usually actuated by a rod mounted below the instrument panel of the vehicle in a position convenient to the operator, or by a foot operated pedal disposed below the instrument panel. Means is commonly provided for releasably locking the brake actuating mechanism in applied position with the result that the brake must be released by the operator prior to operation of the vehicle.

Frequently an operator will leave a vehicle without applying the parking brake and while in many instances, the gear shift lever is placed in reverse in order to hold the vehicle in position, nevertheless, this gear shift lever may accidentally slip out resulting in movement of the vehicle or as in the case with many present day automatic transmissions, there is no means provided whereby the vehicle may be locked against movement except by use of the parking brake. Certain automobiles equipped with automatic transmissions are provided with a parking lock which is intended to limit movement of the vehicle, but these locks frequently fail and in the event the vehicle is parked on an incline, movement of the same follows with sometimes disastrous results.

It, therefore, appears that the provision of mechanism for automatically applying the parking brake of a vehicle without any thought or specific action on the part of the operator represents a step forward in the art and serves to fill a long felt need.

It is, therefore, an object of the invention to provide a door operated vehicle brake mechanism which may be conveniently applied to a vehicle, either as original equipment or as an accessory and which will operate to automatically apply the parking brake upon opening of one or more doors of the vehicle.

A further object of the invention is the provision of a door operated vehicle brake mechanism which may be conveniently and economically manufactured and installed as accessory equipment on the vehicle and in which the same may be connected only to the door on the driver's side of the vehicle or may also be connected to such door and to the opposite front door of the vehicle whereby upon opening of either door the parking brake will be automatically applied.

A still further object of the invention is the provision of a door operated vehicle brake mechanism which may be furnished in kit form and installed in an existing vehicle without modification of the existing structure and without the necessity of utilizing special tools or requiring the services of a highly skilled person.

Another object of the invention is the provision of a door operated vehicle brake mechanism which may be conveniently installed in existing motor vehicles and which will in no way interfere with the normal conventional operation of the parking brake.

A further object of the invention is the provision of a door operated vehicle brake mechanism which may be conveniently installed in vehicles utilizing a foot pedal for actuating the parking brake and in which such foot pedal is operated by opening the door on the driver's side of the vehicle.

Figure 2:
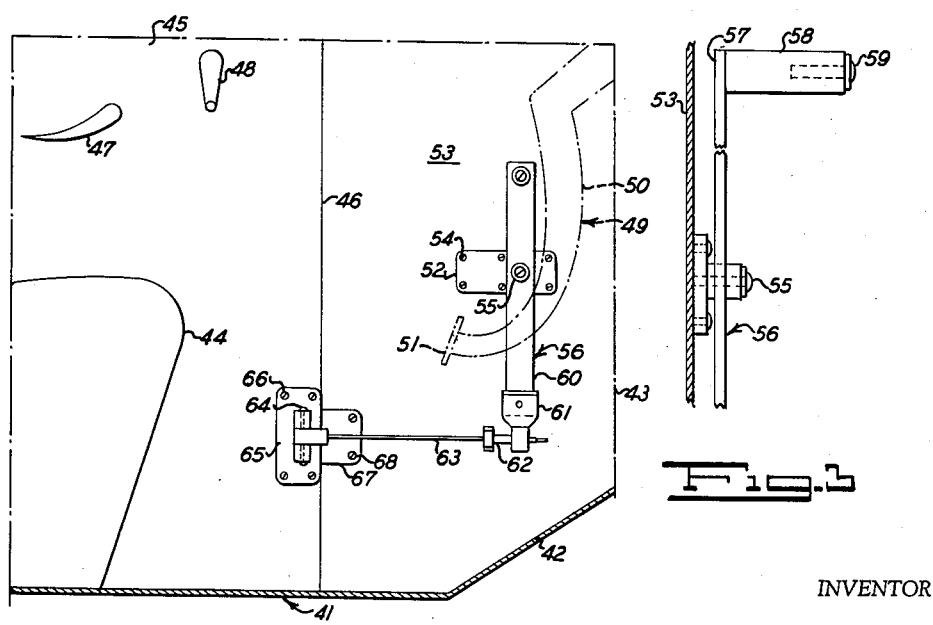

Further objects and advantages of the invention will be apparent from the following description taken in conjunction with the accompanying drawing wherein:

FIG. 1 is a fragmentary side elevational view with parts in section for greater clarity and showing a door operated brake mechanism for use in vehicles having a parking brake operated by a foot pedal;

FIG. 2 a view similar to FIG. 1, but showing a slightly modified form of the invention; and FIG. 3 a fragmentary elevational view with parts in section for greater clarity and showing the manner of mounting the rocker arm for operating the parking brake pedal.

With continued reference to the drawing, there is shown in FIG. 1 a portion of a vehicle body 10, there being also shown a floor board 11, a fire wall 12 and a portion of an instrument panel 13. Also shown in FIG. 1 is the front seat 14 of the vehicle, as well as a door 15 on the driver's or operator's side of the vehicle, the door 15 being hingedly mounted along a line 16 for opening and closing swinging movement, the door 15 being provided with the usual latch operating handle 17 and a window operating crank member 18.

As shown in FIG. 1, there may be provided a parking brake operating pedal 19 having a lever arm 20 pivotally mounted on the vehicle at an appropriate location and a foot engaging portion 21 disposed in a position convenient to the driver. The pedal operating mechanism 19 is held in applied position by a locking means, not shown, but which is entirely conventional and there may be provided a return spring 22 having one end 23 connected to the lever arm 20 and the opposite end 24 connected to an eye 25 secured to the vehicle. A bracket 26 has one end 27 secured to the floor board 11 of the vehicle by screw threaded or other suitable fastening means 28 and on the opposite end 29 of the bracket 26 there is pivotally mounted by a pin 30 a rocker arm 31. One end 32 of the rocker arm 31 is connected through a tension member 33 with the pedal 19 and the opposite end 34 of the rocker arm 31 is connected through a tension spring 35 with a cable 36 which in turn is connected to an eye 37 mounted on the door 15 on the driver's side of the vehicle. A return spring 38 has one end 39 connected to the end 34 of the rocker arm 31 and the opposite end 40 connected to the floor board 11.

In operation, upon opening of the door 15 tension will be applied to the cable 36 which through the spring 35 will cause the rocker arm 31 to pivot about the pin 30 and through the tension member 33 to depress the pedal 19 thereby applying the parking brake of the vehicle. Any excess movement of the door 15 beyond the position at which the parking brake is fully applied will be compensated for by the tension spring 35. Upon release of the locking mechanism for the pedal 19, the return spring 38 will move the rocker arm 31 and cable 36 to original position.

In FIGS. 2 and 3 there is shown a slightly modified form of the invention and in FIG. 2 there is shown a portion 41 of a vehicle body, as well as a floor board 42, a fire wall 43, a portion of the driver's seat 44 and a door 45 hingedly mounted along a line 46 for opening and closing movement. The door 45 is provided with the usual latch operating handle 47 as well as a crank 48 for operating the window.

In this form of the invention there may be provided a parking brake operating pedal 49 having a lever arm 50 pivotally mounted on the vehicle at an appropriate location and terminating in a foot engaging portion 51 disposed in a position convenient to the driver. The pedal operating mechanism 49 is held in applied position by a locking means, not shown, but which is entirely conventional.

A bracket 52 may be mounted on the side wall 53 of the vehicle by screw threaded or other suitable fastening means 54 and pivotally mounted intermediate the length thereof on the bracket 52 by a pivot pin 55 is a rocker arm 56. The rocker arm 56 is provided on one end 57 with a roller 58 which may be rotatably mounted on the rocker arm 56 by screw threaded or other suitable fastening means 59 and the opposite end 60 of the rocker arm 56 is provided with a fitting 61 to which is adjustably attached by suitable means 62 a flexible cable 63. The opposite end of the cable 63 is pivotally connected by means of a pivot pin 64 to a plate 65 which in turn is secured by screw threaded or other suitable fastening means 66 to the door 45 on the driver's side of the vehicle. A wear plate 67 may be secured to the side wall or panel 53 of the vehicle by screw threaded or other suitable fastening means 68 and the purpose of the wear plate 67 will be presently described.

In the operation of the above described form of the invention, upon opening of the door 45 on the driver's side of the vehicle, the cable 63 will be pulled outwardly which will operate to move the rocker arm 56 in a clockwise direction as viewed in FIG. 2, and upon such movement the roller 58 will engage the lever arm 50 of the pedal mechanism 49 resulting in moving the pedal mechanism in a manner to apply the vehicle brake. Upon opening of the door 45 the cable 63 will engage the wear plate 67 thereby preventing damage to the side wall panel 53 of the vehicle and also preventing undue wear on the cable 63. Upon closing of the door 45, the brake pedal mechanism 49 may be released by operating the usual brake locking means.

It will be seen that by this form of the invention there has been provided a parking brake operating mechanism which requires no modification whatsoever of any of the brake mechanism or pedal operating means, but only requires mounting of the device on the sidewall or panel of the vehicle and on the door on the driver's side of the vehicle. The device is extremely simple in structure and obviously will efficiently operate to perform the intended function.

It will accordingly be seen that by the above described invention there has been provided a convenient, simple and economical mechanism for application to a vehicle as an accessory or as additional equipment and which provides for automatic application of parking brakes by opening the door on the driver's side of the vehicle and which will result in preventing movement of the vehicle inadvertently due to failure to apply the brake on the part of the driver or due to failure of transmission or other locking means intended to prevent movement of the vehicle. In this manner, many accidents resulting from inadvertent movement of vehicles in the absence of the driver may be prevented.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. Door operated vehicle brake mechanism comprising a foot operated pedal for applying the vehicle brakes, a bracket mounted on the vehicle below said pedal, a rocker arm pivotally mounted intermediate the ends thereof on said bracket, a tension member connecting one end of said arm and said pedal, a tension spring connected to the opposite end of said arm, a flexible cable connected to said tension spring and a door of the vehicle and a return spring connected to said opposite end of said arm and said vehicle, whereby upon opening of said door, said cable will operate through said arm and said tension member to depress said pedal and apply the vehicle brakes, said return spring operating to return said arm to original position and maintain tension in said cable upon closing of said door.

2. Door operated vehicle brake mechanism comprising a foot operated pedal for applying the vehicle brakes, a bracket mounted on the vehicle below said pedal, a rocker arm pivotally mounted intermediate the ends thereof on said bracket, a tension member connecting one end of said arm and said pedal, a flexible cable connected to the opposite end of said arm and a door of the vehicle and a return spring connected to said opposite end of said arm and said vehicle, whereby upon opening of said door said cable will operate through said arm and said tension member to depress said pedal and apply the vehicle brakes, said return spring operating to return said arm to original position and maintain tension in said cable upon closing of said door.

3. Door operated vehicle brake mechanism comprising a foot operated pedal for applying the vehicle brakes, a bracket mounted on the vehicle below said pedal, a rocker arm pivotally mounted intermediate the ends thereof on said bracket, a tension member connecting one end of said arm and said pedal and a flexible cable connected to the opposite end of said arm and to a door of the vehicle, whereby upon opening of said door said cable will operate through said arm and said tension member to depress said pedal and apply the vehicle brakes.

4. Door operated vehicle brake mechanism comprising a lever pivotally mounted on the vehicle and terminating in a foot engaging member to provide a foot operated pedal for applying the vehicle brakes, a bracket mounted on the vehicle adjacent said lever, a rocker arm pivotally mounted intermediate the ends thereof on said bracket, a lever engaging roller on said arm adjacent one end and a flexible cable adjustably connected to said arm adjacent the opposite end and to a door of the vehicle, whereby upon opening of said door said cable will operate to move said rocker arm and engage said roller with said lever to apply the vehicle brakes.

5. Door operated vehicle brake mechanism comprising a lever pivotally mounted on the vehicle and terminating in a foot engaging member to provide a foot operated pedal for applying the vehicle brakes, a bracket mounted on the vehicle adjacent said lever, a rocker arm pivotally mounted intermediate the ends thereof on said bracket, a lever engaging roller on said arm adjacent one end and cable means connected to said arm adjacent the opposite end and to a door of the vehicle, whereby upon opening of said door said cable means will operate to move said rocker arm and engage said roller with said lever to apply the vehicle brakes.

6. Door operated vehicle brake mechanism comprising a lever pivotally mounted on the vehicle and terminating in a foot engaging member to provide a foot operated pedal for applying the vehicle brakes, a bracket mounted on the vehicle adjacent said lever, a rocker arm pivotally mounted intermediate the ends thereof on said bracket, lever engaging means on said arm adjacent one end and cable means connected to said arm adjacent the opposite end and to a door of the vehicle, whereby upon opening of said door, said cable means will operate to move said rocker arm and engage said engaging means with said lever to apply the vehicle brakes.

References Cited in the file of this patent

UNITED STATES PATENTS

| | | |
|---|---|---|
| 2,866,511 | Niederoest | Dec. 30, 1958 |
| 2,945,546 | Niederoest | July 19, 1960 |
| 2,963,107 | Farber | Dec. 6, 1960 |